(12) United States Patent
Moffett et al.

(10) Patent No.: US 11,610,366 B2
(45) Date of Patent: Mar. 21, 2023

(54) SYSTEMS AND METHODS FOR GENERATING NON-APPROXIMATED THREE-DIMENSIONAL REPRESENTATIONS

(71) Applicant: General Lattice, Inc., Chicago, IL (US)

(72) Inventors: Marek Moffett, Atlanta, GA (US); Nick Florek, Chicago, IL (US); Alex Rhoades, Oak Brook, IL (US)

(73) Assignee: General Lattice, Inc., Chicago, IL (US)

( * ) Notice: Subject to any disclaimer, the term of this patent is extended or adjusted under 35 U.S.C. 154(b) by 118 days.

(21) Appl. No.: 17/327,276

(22) Filed: May 21, 2021

(65) Prior Publication Data

US 2021/0407190 A1    Dec. 30, 2021

Related U.S. Application Data

(60) Provisional application No. 63/028,497, filed on May 21, 2020.

(51) Int. Cl.
| | | |
|---|---|---|
| *G06T 17/10* | (2006.01) | |
| *G06T 19/20* | (2011.01) | |
| *G06T 17/30* | (2006.01) | |
| *G06T 17/20* | (2006.01) | |

(52) U.S. Cl.
CPC .............. *G06T 17/10* (2013.01); *G06T 19/20* (2013.01); *G06T 17/20* (2013.01); *G06T 17/30* (2013.01); *G06T 2219/2004* (2013.01)

(58) Field of Classification Search
CPC . G06T 17/10; G06T 19/20; G06T 2219/2004; G06T 17/30; G06T 17/20
See application file for complete search history.

(56) References Cited

U.S. PATENT DOCUMENTS

| | | | | |
|---|---|---|---|---|
| 2008/0021684 | A1* | 1/2008 | Dulac | G01V 11/00 703/9 |
| 2014/0176545 | A1* | 6/2014 | Laine | G06T 11/40 345/424 |

(Continued)

OTHER PUBLICATIONS

Mittag et al. "Form follows function: a computational simulation exercise on bone shape forming and conservation", Nov. 15, 2014, Hylonome (Year: 2014).*

(Continued)

*Primary Examiner* — YuJang Tswei
(74) *Attorney, Agent, or Firm* — K&L Gates LLP (57) ABSTRACT

A modeling system includes a controller in communication with a memory, the memory including a unit cell defined by a unit cell structure and a control voxel, wherein the unit cell structure is mapped to the control voxel. The controller is configured to: divide a three-dimensional geometry into a plurality of voxels; and populate each voxel with a corresponding unit cell. For each voxel, the corresponding unit cell structure is modified to fit within each voxel according to the mapping of the unit cell structure to the control voxel surfaces by positioning the unit cell structure relative to the voxel surfaces corresponding to the control voxel surfaces of the mapping. At least one of the voxels of the plurality of voxels has a voxel shape that is different than a control voxel shape of the control voxel.

12 Claims, 6 Drawing Sheets

(56) References Cited

U.S. PATENT DOCUMENTS

2015/0324490 A1* 11/2015 Page ................. G06Q 30/0621
                                                            700/98
2017/0372513 A1* 12/2017 Zeng ....................... G06T 17/00
2019/0197205 A1*  6/2019 Schmidt .................. G06F 30/20
2019/0227526 A1*  7/2019 Taber ................. G05B 19/4099
2019/0388123 A1* 12/2019 Pavlovskaia ........... A61B 90/37

OTHER PUBLICATIONS

Tozoni et al. "A Low-Parametric Rhombic Microstructure Family for Irregular Lattices", 2020, ACM (Year: 2020).*

* cited by examiner

SYSTEMS AND METHODS FOR GENERATING NON-APPROXIMATED THREE-DIMENSIONAL REPRESENTATIONS

CROSS-REFERENCE TO PRIOR FILED APPLICATIONS

This application incorporates by reference and claims the benefit of priority to U.S. Provisional Application No. 63/028,497 filed on May 21, 2021, the entirety of which is incorporated herein by reference.

BACKGROUND OF THE INVENTION

The present subject matter relates generally to a methodology of representing three dimensional (3D) objects for modeling, analysis, and manufacturing applications. More specifically, the present subject matter provides systems and methods for the generation and application of manipulatable voxels to create non-approximated representations of a 3D geometry.

It is standard practice in modeling, analysis, and manufacturing technologies to use approximated methods of describing or representing 3D objects. When creating an electronic file for use in additive manufacturing (e.g., 3D printing), it is common to use approximated methods using polygon-based voxels (i.e., twisted boxes) or 'meshed' (e.g., .stl or .obj) data formats to describe or representing a 3D object.

These approximations use polygons to approximate curved geometry. A decrease in the size and an increase in the number of polygons (i.e., the greater number of polygons used to represent the geometry) corresponds to an increase in accuracy of how closely the representation approximates the 3D object, but these approximations are inherently inaccurate. Previous attempts to improve the approximations by subdividing, shifting, scaling, and morphing polygon-based voxels to better approximate 3D geometry cannot match the exact surface of the underlying 3D geometry.

While these methods are great for quickly representing simple 3D geometries in a single state, these simple approximations are plagued with syntax errors when representing complex geometries. The use of the approximated representations can inhibit further operations (e.g., modeling, analysis, and manufacturing), in which the errors of the approximation lead to additional and magnified errors in the downstream operations.

Accordingly, a need exists for systems and methods for generating non-approximated representations of geometry to be used in modeling, analysis, and manufacturing.

BRIEF SUMMARY OF THE INVENTION

To meet the needs described above, the subject matter described herein provides systems and methods for the generation of 3D representations that divides a 3D geometry into a plurality of voxels and populates the voxels with unit cells that conform to fit proportionately within each voxel. By creating a clean set of voxels and modifying the unit cell structure to fill the voxels, the 3D representation more accurately reflects the 3D geometry than a polygon approximation would.

The modeling system utilizes a unit cell. Each unit cell includes a control voxel and a unit cell structure defined relative to the control voxel. In one embodiment, the control voxel includes six control voxel surfaces that are grouped into three opposing pairs of control voxel surfaces to form a cube structure. Although it is contemplated that a cube-shaped voxel will be used in primary embodiments, more complex structures may be used as voxels, for example a dodecahedron.

As described in greater detail herein, 3D representations are created by segmenting 3D geometry into a set of voxels and then populating the voxels with unit cells. The unit cell structure fills the three-dimensional geometry of each voxel to form the structure of the 3D representation. The unit cells are based on a uniform shape called a control voxel. In the primary embodiment, the unit cells are based on a cube-shaped control voxel. However, the voxels defining the 3D representation are non-uniform in size and shape; therefore, each unit cell must be modified to conform to its associated voxel when populating the voxels with the unit cells. In other words, the base shape of the unit cell may need to be modified when populating a voxel to more accurately represent the 3D geometry represented by the 3D representation.

In order to define a modifiable unit cell, a set of control points is identified throughout the unit cell structure. Each of the control points are then mapped relative to the control voxel surfaces. In a primary example, sets of first, second, and third control voxel lines are drawn through each control point; the first voxel line spans the first opposing pair of control voxel surfaces, the second voxel line spans the second opposing pair of control voxel surfaces and, and the third voxel line spans the third opposing pair of control voxel surfaces. Each control point location is thereby defined by the intersection of the set of first, second, and third control voxel lines passing through the control point. For example, a first control point value indicates the position of the control point on the first control point line between the first pair of control voxel surfaces. The control voxel line has a length of 1, and the control point location on the control voxel line is between 0 and 1. Accordingly, each control point has a control point value that may be represented in three-dimensions as [X, Y, Z], with X, Y, Z being the position of the control point on the respective control voxel line.

As described, the modeling system divides the 3D geometry being represented into a plurality of voxels. In one embodiment, the modeling system first creates a surface generally along the X, Y plane and divides the surface into a plurality of quadrangles. The parameterization of the surface into quadrangles optimizes the UV data of the 3D geometry to create a clean set of quadrangles. Each quadrangle forms a side of a voxel, and the clean set of quadrangles ensures that each voxel has a sufficient size and shape for receiving a unit cell structure.

Next, the modeling system divides the height of the 3D geometry into two or more surfaces along the Z-axis, each surface having corresponding quadrangles. Voxels are created by pairing quadrangles of adjacent surfaces and generating voxel surfaces between the edges of the paired quadrangles. The number of surfaces, specifically the number of intermediate surfaces between outermost surfaces, may be selected by the user or determined automatically by the modeling system. In some embodiments, after the surfaces are generated, the user may manually modify the location of each surface along the Z-axis as well as the location of edges within the quadrangles.

The modeling system then populates each voxel with a corresponding unit cell. As noted, the shapes of the voxels can vary non-uniformly throughout the 3D representation. Therefore, the unit cell may be modified to proportionately fill each voxel according to the individual voxel's shape.

Specifically, each voxel shape in the 3D representation can be different from the control voxel shape, and the unit cell structure is modified to fit within the voxel. The modification of the unit cell is facilitated using the defined control point values.

In one example, sets of first, second, and third voxel lines, corresponding to the sets of first, second, and third control voxel lines, are drawn between first, second, and third pairs of opposing voxel surfaces, corresponding to the first, second, and third pairs of opposing control voxel surfaces. Each control point of the unit cell structure is then mapped onto a corresponding point of intersection of each set of first, second, and third voxel lines. Using the control point values derived from the control voxel, the unit cell structure is thereby morphed to fit within each uniquely shaped voxel in the 3D representation. By distributing the changes to the unit cell throughout the full volume of the voxel, the unit cell structure more properly maintains its structural integrity while being modified to fit within each unique voxel shape.

In light of the disclosure set forth herein, and without limiting the disclosure in any way, in a first aspect, which may be combined with any other aspect or portion thereof described herein, a connection assist device, a modeling system includes a controller in communication with a memory, the memory including a unit cell defined by a unit cell structure and a control voxel, the control voxel including a plurality of control voxel edges and a plurality of control voxel surfaces, each control voxel surface spanning adjacent control voxel edges, wherein the unit cell structure is defined by a mapping of the unit cell structure to the control voxel surfaces. The memory further includes program instructions that, when executed, cause the controller to: divide a three-dimensional geometry into a plurality of voxels, each voxel defined by a plurality of voxel surfaces and a plurality of voxel edges, each voxel surface spanning adjacent voxel edges, and wherein each voxel surface has a shape, wherein the number of voxel edges is equal to the number of control voxel edges and the number of voxel surfaces is equal to the number of control voxel surfaces; and populate each voxel with a corresponding unit cell, wherein, for each voxel, the corresponding unit cell structure is modified to fit within each voxel according to the mapping of the unit cell structure to the control voxel surfaces by positioning the unit cell structure relative to the voxel surfaces corresponding to the control voxel surfaces of the mapping, and wherein at least one of the voxels of the plurality of voxels has a voxel shape that is different than a control voxel shape of the control voxel.

In a second aspect, which may be combined with any other aspect or portion thereof described herein unless otherwise specified, the plurality of control voxel surfaces are grouped into pairs of control voxel surfaces, and the controller is configured to: identify a control point on the unit cell structure; provide a control voxel line between each pair of the pairs of control voxel surfaces that passes through the control point; and identify a control point value for the control point on each control voxel line, wherein the mapping of the unit cell structure to the control voxel surfaces comprises a set of control point values.

In a third aspect, which may be combined with any other aspect or portion thereof described herein unless otherwise specified, the plurality of voxel surfaces are grouped into pairs of voxel surfaces that correspond to the pairs of control voxel surfaces, and the controller is configured to: modify the unit cell structure to fit within each voxel by positioning the control point of the unit cell structure relative to the voxel surfaces according to the set of control point values of the mapping.

In a fourth aspect, which may be combined with any other aspect or portion thereof described herein unless otherwise specified, the controller is configured to provide a voxel line between each pair of the pairs of voxel surfaces corresponding to each control voxel line between each pair of the pairs of control voxel surfaces; and position the control point within the voxel such that the voxel lines extend through the control point at a point proportional to the set of control point values.

In a fifth aspect, which may be combined with any other aspect or portion thereof described herein unless otherwise specified, the plurality of control voxel surfaces comprises six control voxel surfaces and is grouped into first, second, and third pairs of control voxel surfaces. First, second, and third control voxel lines between the first, second, and third pairs of control voxel surfaces, respectively, pass through the control point. First, second, and third control point values are provided for the first, second, and third control voxel lines, and the set of control point values includes the first, second, and third control point values. The plurality of voxel surfaces comprises six voxel surfaces and is grouped into first, second, and third pairs of voxel surfaces corresponding to the first, second, and third pairs of control voxel surfaces, respectively, and first, second, and third voxel lines between the first, second, and third pairs of voxel surfaces are provided. Finally, the control point of the unit cell structure is positioned within the voxel such that the first, second, and third voxel lines pass through the control point according to the set of control point values defined relative to the control voxel surfaces.

In a sixth aspect, which may be combined with any other aspect or portion thereof described herein unless otherwise specified, the step of dividing a three-dimensional geometry into the plurality of voxels comprises the steps of: generate a surface generally along an X, Y plane; divide the surface into a plurality of polygons by defining the plurality of polygons in part by a curve network of the three-dimensional geometry; provide a plurality of surfaces along a Z-axis of the 3D geometry, each surface including the plurality of polygons; and generate the plurality of voxels based on the plurality of surfaces, wherein each voxel is formed by a pair of adjacent polygons of adjacent surfaces, the voxel surfaces comprising the corresponding pair of adjacent polygons and areas spanning edges of the pair of adjacent polygons.

In a seventh aspect, which may be combined with any other aspect or portion thereof described herein unless otherwise specified, each polygon is a quadrangle. Further, at least one polygon in the plurality of polygons may be adjusted along the X, Y plane by a user, and/or at least one surface in the plurality of surfaces may be adjusted along the Z-axis by a user.

In an eighth aspect, any of the features, functionality, and alternatives described in connection with any one or more of FIGS. 1 to 7C may be combined with any of the features, functionality, and alternatives described in connection with any other of FIGS. 1 to 7C.

It is understood that the conformal voxels provided herein can be used in a large range of uses, workflows, and techniques within the 3D modelling, CAD/CAE, FEA, and manufacturing sectors. For example, geometry represented by conformal voxels can be translated (i.e., imported/exported) into existing CAD platforms as conformal geometry to be manipulated, referenced, and combined; just like traditional solid geometry.

An object of the invention is to represent a geometry using manipulatable, conforming voxels.

Another object of the invention is to generate non-approximated geometric representations in which the size of the voxels does not affect the accuracy of the voxel structure.

Additional objects and advantages will be apparent to those skilled in the art based on the disclosure provided herein.

BRIEF DESCRIPTION OF THE DRAWINGS

The figures depict one or more embodiments of the subject matter described herein. They are provided as examples only. Within the figures, reference numbers are used to refer to elements described in the detailed description.

DETAILED DESCRIPTION OF THE INVENTION

Figure 1:
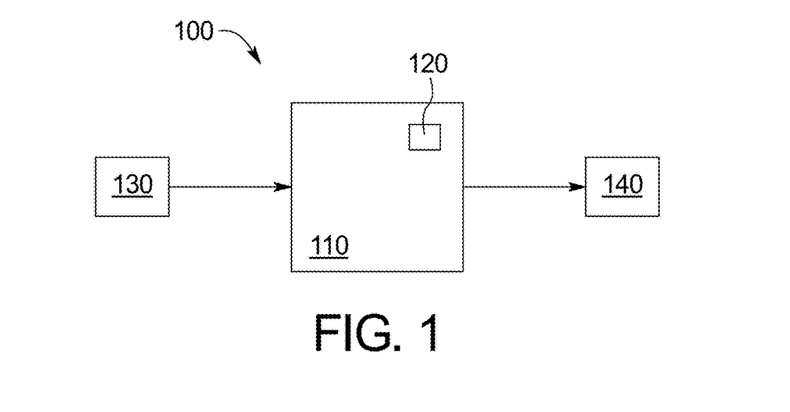
FIG. 1 illustrates a schematic modeling system of the present application.

FIG. 1 illustrates a modeling system that generates a 3D representation of a 3D geometry using manipulatable voxels as described herein. More specifically, the modeling system generates the 3D representation by dividing the 3D geometry into a plurality of voxels and populating each voxel with a unit cell, each unit cell including a unit cell structure that conforms to the respective voxel shape. The voxels within the plurality of voxels can be modified such that each voxel provides a sufficient volume for receiving a unit cell. Additionally, the unit cell is modified to fit within the uniquely shaped voxels. The resulting 3D representation matches the underlying 3D geometry exactly without the need for approximating surfaces.

Referring to FIG. 1, the modeling system 100 includes a processor 110 and a memory 120 in communication with the processor 110. The memory 120 stores program instructions that, when executed by the processor 110, cause the processor 110 to perform the features and functions described herein. In one application, the modeling system 100 receives the 3D geometry 130 and generates the 3D representation 140.

Figure 2:
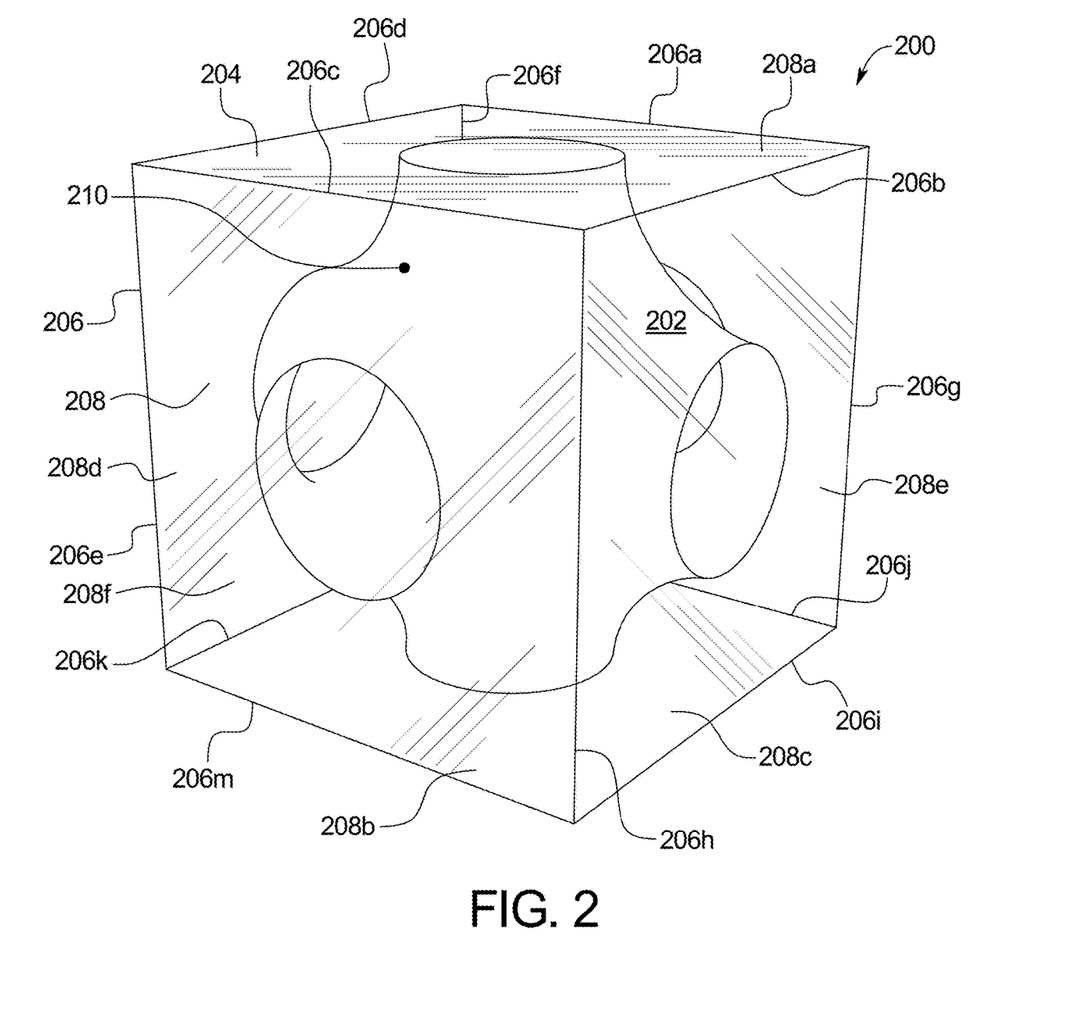
FIG. 2 is a perspective view of a unit cell for use with the modeling system of FIG. 1.

Referring to FIG. 2, the modeling system uses a unit cell 200 as the basic component to build the 3D representation 140. Each unit cell 200 is defined by a unit cell structure 202 within a control voxel 204. In a preferred embodiment, the unit cell structure 202 is a structurally sound shape that joins easily to an adjacent unit cell on each side thereof. In the illustrated embodiment, the unit cell structure is a round, central body that curves toward an opening on each side surface of the control voxel 204. In the final 3D representation, each opening is aligned with another opening of an adjacent unit cell structure in order to create a series of connected unit cells. In some embodiments, the modeling system 100 includes a library of unit cells with varying unit cell structures and control voxel shapes.

The control voxel 204 includes a plurality of control voxel edges 206 and a plurality of control voxel surfaces 208, with each control voxel surface 208 spanning adjacent control voxel edges 206. In the embodiment illustrated in FIG. 2, the control voxel 204 includes 12 control voxel edges 206a-206m. Each of the six control voxel surfaces 208a-208f spans four adjacent control voxel edges 206.

In other embodiments, the control voxel 204 may have a varying number of control voxel surfaces 208 and control voxel edges 206 as desired. For example, the control voxel may comprise a 20-sided polyhedron, a plurality of which fit together to form a 3D representation or object. Increasing the number of surfaces of the control voxel provides additional surfaces for defining the control points on a unit cell structure 202, which is helpful when the unit cell structure is complex.

The shape and positioning of the unit cell structure 202 is defined relative to the control voxel 204. In the illustrated embodiment, the modeling system 100 identifies a plurality of control points 210 on the unit cell structure 202 and maps the control points 210 to the control voxel surfaces 208a-208f. For the purposes of illustration, a single control point 210 is shown in FIG. 2, although the number of control points used to define a unit cell structure is typically much greater during use. Increasing the number of control points 210 will increase the accuracy with which the unit cell structure is modified to fit the corresponding voxel.

Figure 3:
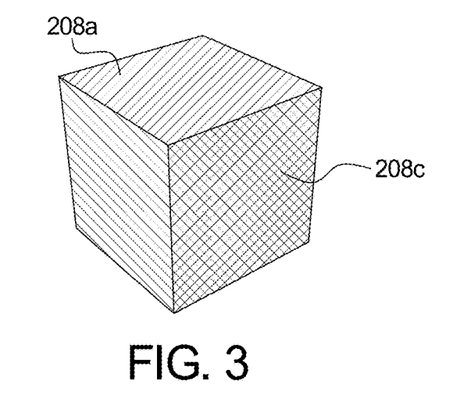
FIGS. 3 and 3A-3C are perspective views of a control voxel of the unit cell of FIG. 2.
Figure 3A:
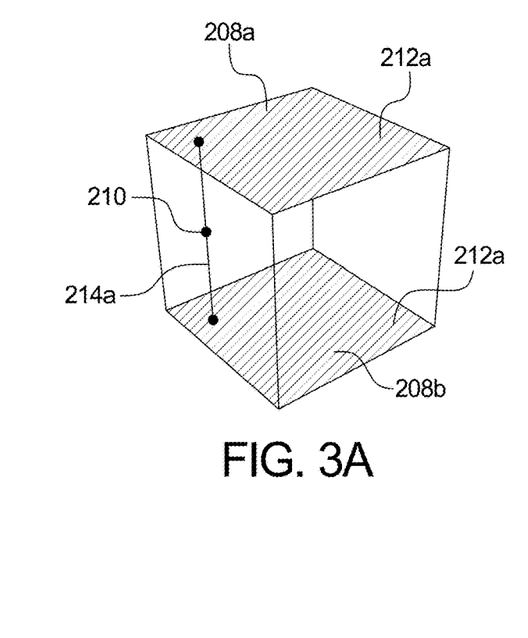
Figure 3B:
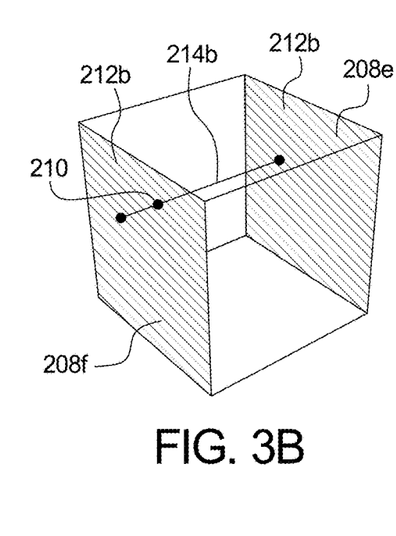
Figure 3C:
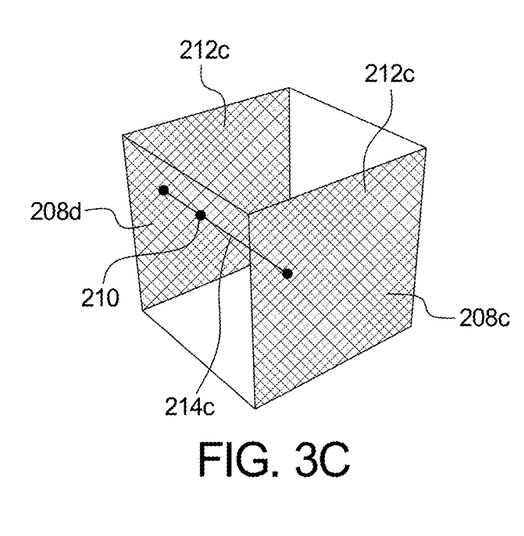

In the embodiment shown in FIGS. 3 and 3A-3C, the six control voxel surfaces 208a-208f are paired into three groups 212a-212c of two opposing surfaces. At each control point 210 on the unit cell structure 202, first, second, and third control voxel lines 214a-214c are drawn between the first, second, and third pairs 212a-212c of control voxel surfaces 208. For example, the first control voxel line 214a is drawn between the first control voxel surface 208a and the second control voxels surface 208b as shown in FIG. 3C. The control point 210 is given a first control voxel value between 0 and 1, identifying a distance from the first control voxel surface 208a. The process is repeated for the second and third control voxel lines 214b, 214c, providing second and third control voxel values, each between 0 and 1. Each control point 210 is therefore defined by a set of control point values [X, Y, Z] measured along each of the three intersecting control voxel lines 214a, 214b, 214c. As is described below, these control point values enable the unit cell structure 202 to be manipulated to fit proportionately within a differently shaped voxel.

Figure 4:
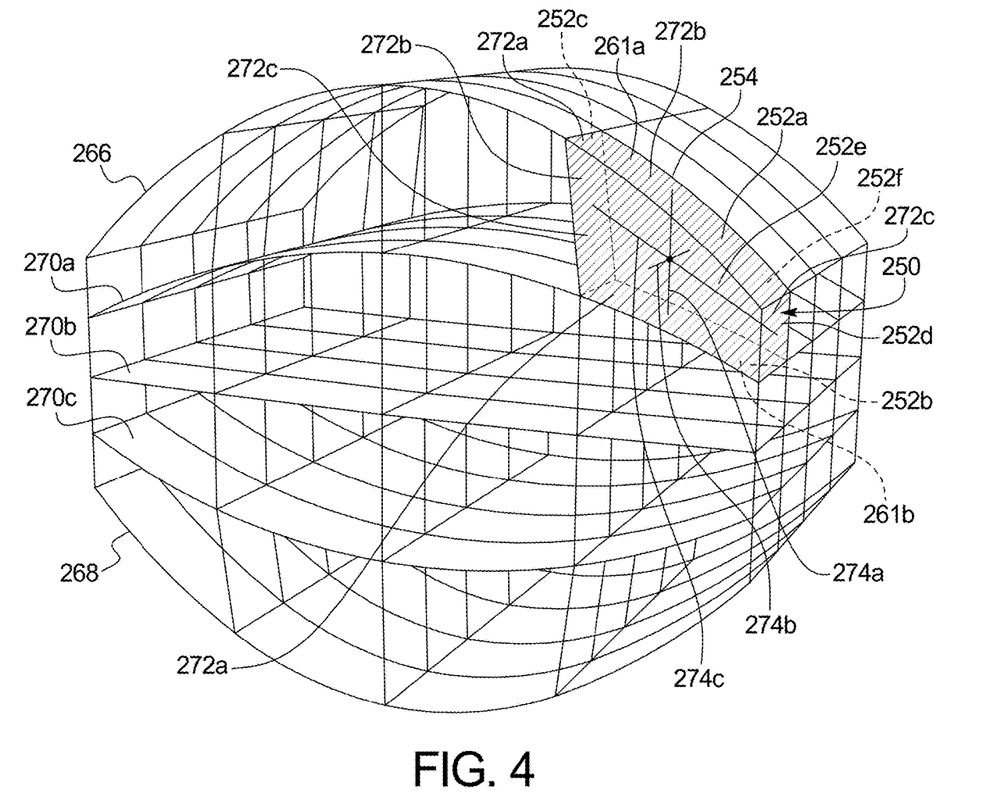
FIG. 4 is a perspective view of a plurality of voxels as used in the modeling system of FIG. 1.
Figure 7A:
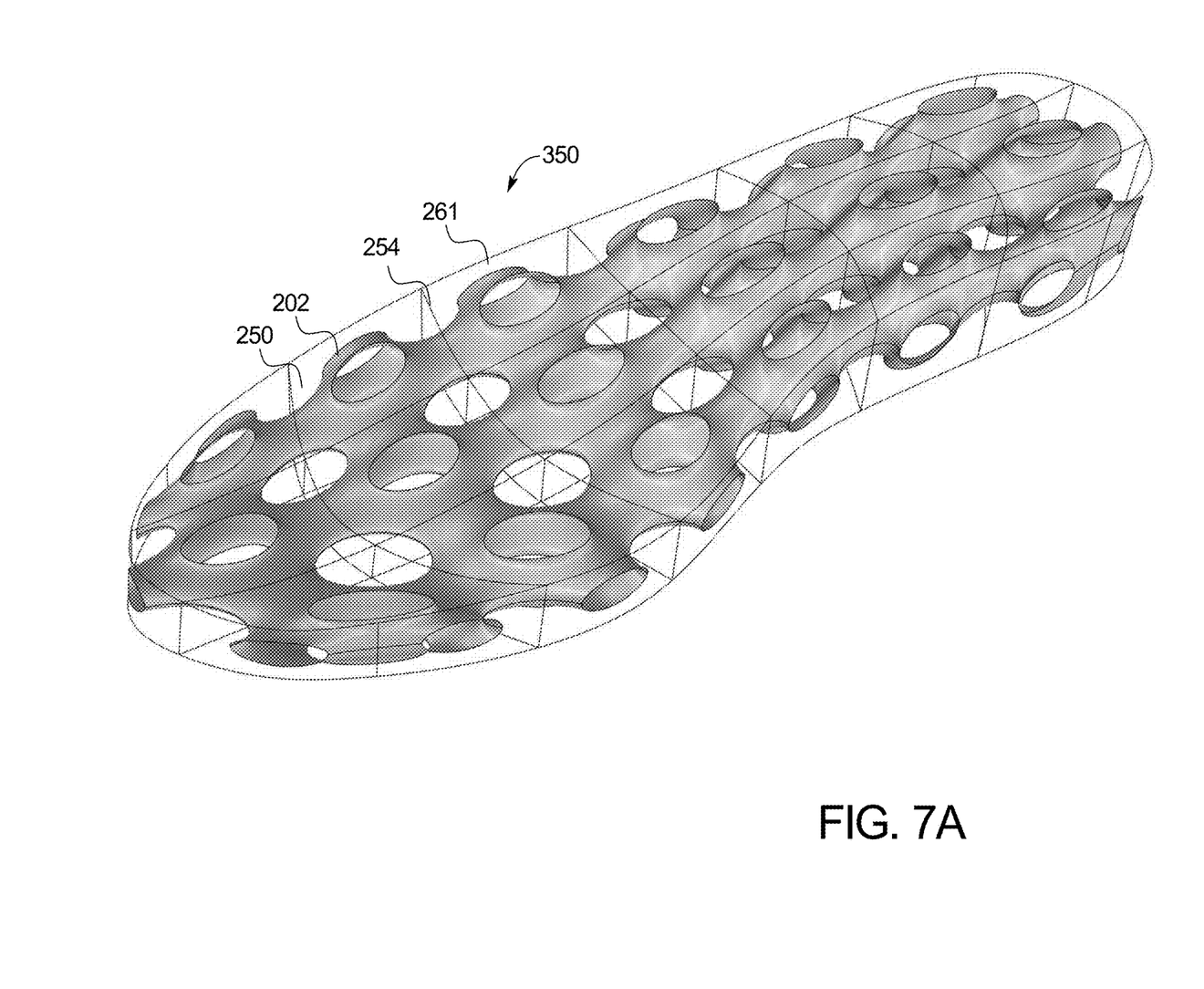
FIG. 7A is a perspective view of a 3D representation of a shoe sole provided by the modeling system of FIG. 1.
Figure 7B:
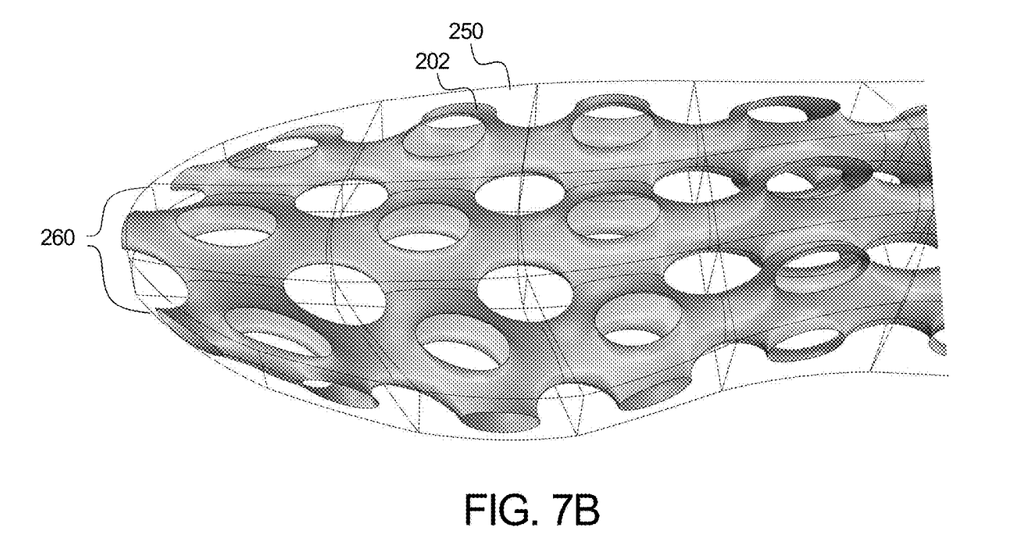
FIGS. 7B and 7C are enlarged side elevational and perspective views of portions of the shoe sole of FIG. 7A.
Figure 7C:
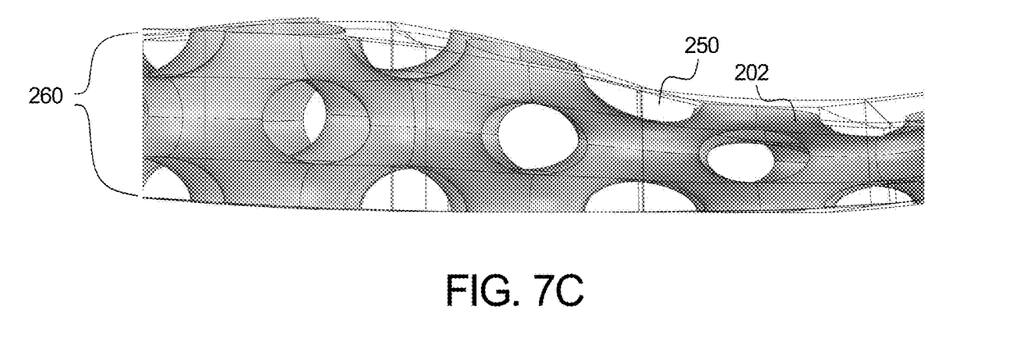

Referring to FIG. 4, the modeling system 100 divides the 3D geometry 130 into a plurality of voxels 250, which are populated with the unit cell 200 in a subsequent step to generate the 3D representation 140. Each voxel 250 is defined by a plurality of voxel surfaces 252 and a plurality of voxel edges 254, with each voxel surface 252 spanning adjacent voxel edges 254. Each voxel edge 254 has a shape, thereby forming in part the shape of each related voxel surface 252. FIGS. 7A-7C illustrate an example 3D representation 350 of a shoe sole generated using the modeling system 100 described herein. While a methodology of generating the plurality of voxels is described herein with reference to FIGS. 4-5B, the modeling system 100 is not limited to such methodology, and any suitable method to generate voxels may be used.

Figure 5A:
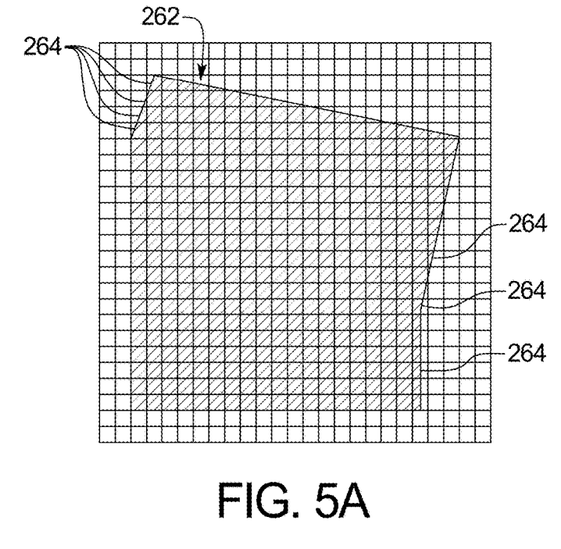
FIGS. 5A and 5B illustrate parameterization of surfaces as used in the modeling system of FIG. 1.
Figure 5B:
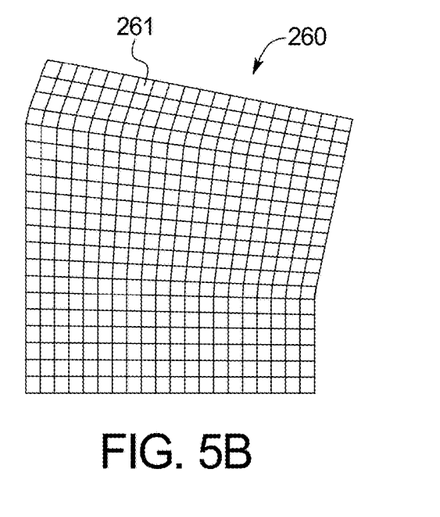

FIGS. 5A and 5B demonstrate how the modeling system 100 optimizes the underlying curve network, known as the UV data, of the 3D geometry to divide a single surface 260, generally along the X, Y plane, of the 3D geometry neatly into quadrangles 261. As each quadrangle 261 forms a voxel surface 252 of a voxel 250, it is preferable that each generated quadrangle 261 has a sufficient size and shape to receive a unit cell, or, more specifically, a unit cell structure.

A conventional approach to dividing the surface of the geometry into quadrangles is simply to project the surface onto a graph of equally shaped and spaced squares on an X, Y plane, as shown in FIG. 5A. This projection 262 may result in some quadrangles 264 along the edges being partially filled, leading to voxels that are too small to be filled with a unit cell.

In the presently claimed modeling system, the parameterization of the surface as shown in FIG. 5B generates quadrangles 261 that are defined in part by the intersection of the U, V curves, which eliminates the generation of quadrangles having shapes that are too small for receiving a unit cell structure 202. The quadrangles 261 may be resized and adjusted by the user as well. The shape of the quadrangles 261 may vary throughout the surface. Referring to the shoe sole representation in FIG. 7A, each voxel edge 254 of each quadrangle 261 is a uniquely shaped curved line.

Referring back to FIG. 4, the modeling system 100 uses the surface 260 to generate an upper surface 266, a lower surface 268, and any number of intermediate surfaces 270 along the Z-axis of the 3D geometry. In some embodiments, the user selects the number of intermediate surfaces 270 as needed or desired, while in other embodiments the modeling system 100 may automatically determine the number of intermediate surfaces 270 needed to generate voxels 250 having a minimum or maximum size.

Once the number of intermediate surfaces 270 is identified, the user can shift each surface 260 up or down on the Z-axis in order to further tailor the voxel shapes. The user can also isolate the X- and Y-axes and modify the shape of the quadrangles. As shown in the shoe sole representation of FIGS. 7A-7C, the upper and lower surfaces 260 of the representation are non-planar and include varied curvature throughout the respective surface as is defined by the 3D geometry. Such varied curvature may also appear on intermediate layers 260 in a representation, and may be modified by the user.

Referring to the voxel 250 in FIG. 4, quadrangles 261a, 261b on adjacent parallel surfaces 260 are paired to form opposing upper and lower surfaces 252a, 252b of a voxel 250. The remaining voxel surfaces 252c-252f of the voxel 250 span the paired quadrangles 261a, 261b extending along the height of the voxel 250. The paired quadrangles 261a, 261b provide eight of the voxel edges 254a-254h of the voxel 250, with four additional voxel edges 254i-254m extending parallel to the Z-axis between the paired quadrangles 261a, 261b. The voxel surfaces 252 of the voxel 250 include the paired quadrangles 261a, 261b and additional paired surfaces 252c-252f extending along the height of the voxel between the paired quadrangles.

The voxels 250 defining the 3D geometry vary in size and shape throughout the representation. For example, the voxel surfaces 252 on the outermost voxels 250 have greater curvature than the voxel surfaces 252 on the innermost voxels 250 of the 3D representation. While the number of voxel edges 254 and surfaces 252 of each voxel 250 is equal to the number of control voxel edges 206 and control voxel surfaces 208 of the control voxel 204, at least one of the voxels 250 has a voxel shape that is different from a control voxel shape of the control voxel 204. In order to populate each voxel 250 with the unit cell 200, the unit cell structure 202 is modified in proportion to the modifications needed to morph the control voxel shape to match the voxel shape for each voxel 250. The shoe sole representation of FIGS. 7A-7C demonstrate the morphing of the unit cell structure 202 to fit the voxels 250 having varying shapes and sizes.

In one embodiment, voxel lines 274a-274c, corresponding to the control voxel lines 214a-214c, are drawn between pairs of opposing voxel surfaces 252. Control points 210 of the unit cell structure 202 are then positioned on the voxel lines 274a-274c in accordance with the control point values [X, Y, Z] identified relative to the control voxel 204. The mapping of the control points 210 from the control voxel 204 into the voxel 250 morphs the unit cell structure 202 to adjust and fill the voxel 250.

More specifically, the voxel surfaces 252 are grouped into first, second, and third pairs 272a-272c of opposing voxel surfaces 252 corresponding to the first, second, and third pairs 212a-212c of control voxel surfaces 208a-208f. Voxel lines 274a-274c are drawn between the pairs 272a-272c of opposing voxel surfaces 252, and the locations of the control points 210 of the unit cell structure 202 within the voxel 250 are determined by positioning the control point 210 of the unit cell structure 202 on the corresponding voxel line 212a-212c according to the control point values identified with respect to the control voxel 204 and control voxel lines 214a-214c.

For example, a control point 210 on a unit cell structure 202 is defined relative to the control voxel 204 by the values of [0.3, 0.5, 0.8]. The control value of 0.3 reflects the position of the control point 210 along a first control voxel line 214a extending between the first pair 212a of control voxel surfaces. The control value of 0.5 reflects the position of the control point 210 along a second control voxel line 214b extending between the second pair 212b of control voxel surfaces, and the control value of 0.8 reflects the position of the control point 210 along a third control voxel line 214c extending between the third pair 212c of control voxel surfaces.

When this unit cell 200 is populated into a voxel 250, the control point 210 is positioned along the first, second, and third voxel lines 274a-274c corresponding to the first, second, and third control voxel lines 214a-214c at [0.3, 0.5, 0.8] along the length of the respective voxel line 274. Due to the fitting of the quadrangles 261 within the UV curve and other adjustments to the surfaces, a voxel line 274 may have a different length and/or orientation than the corresponding control voxel line 214. Because the differences between the voxel shape and the control voxel shape are distributed across all of the voxel lines 274 within a single voxel 250, the unit structure 202 is modified proportionately to account for the differences, retaining its structural integrity while being enlarged or minimized to fit within each unique voxel shape.

Figure 6A:
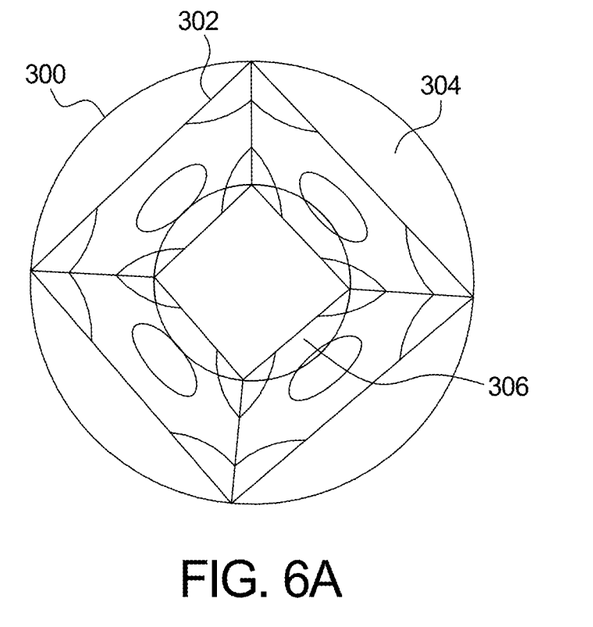
FIGS. 6A and 6B illustrate plan views of a polygon approximation of curved surface with a 3D representation provided by the modeling system of FIG. 1.
Figure 6B:
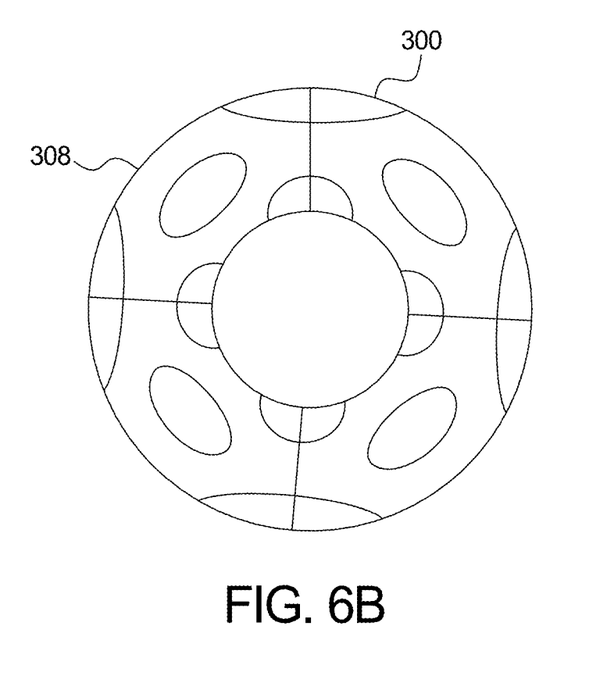

The modeling system 100 generates a 3D representation 140 that matches the curvature of the 3D object exactly, avoiding any approximation and the related inherent shortcomings, by conforming the unit cell structure 202 to fit within each uniquely-shaped voxel 250 of the 3D geometry 130. FIGS. 6A and 6B demonstrate more clearly the shortcomings of polygonal approximations. Conventional 3D printing technology approximates curvature utilizing polygons, which leads to gaps within the corresponding structure where the polygons do not match the curved shape. In FIG. 6A, a polygon approximation 302 of a donut shape 300 creates voids 304 that should be filled but are not, as well as excess portions 306 that are filled when they should not be. FIG. 6B illustrates a representation 308 of the donut shape 300 generated by the modeling system 100 of the present application. Use of the presently described modeling system 100 appropriately fills the donut-shape without voids or excess portions.

Once the voxels 250 are populated with unit cells 202 that are modified proportionately to the shape of the respective voxel 250, the user adjusts the thickness of the surfaces as desired. The final 3D representation 140 can then be used in a third party 3D modeling programs such as Fusion 360®, OnShape®, SolidWorks®, and Rhinoceros 3D®.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A modeling system comprising:
a controller in communication with a memory, the memory including a unit cell defined by a unit cell structure and a control voxel, the control voxel including a plurality of control voxel edges and a plurality of control voxel surfaces, each control voxel surface spanning adjacent control voxel edges, wherein the unit cell structure is defined by a mapping of the unit cell structure to the control voxel surfaces, the memory further including program instructions that, when executed, cause the controller to:
divide a three-dimensional geometry into a plurality of voxels, each voxel defined by a plurality of voxel surfaces and a plurality of voxel edges, each voxel surface spanning adjacent voxel edges, and wherein each voxel surface has a shape, wherein the number of voxel edges is equal to the number of control voxel edges and the number of voxel surfaces is equal to the number of control voxel surfaces; and
populate each voxel with a corresponding unit cell, wherein, for each voxel, the corresponding unit cell structure is modified to fit within each voxel according to the mapping of the unit cell structure to the control voxel surfaces by positioning the unit cell structure relative to the voxel surfaces corresponding to the control voxel surfaces of the mapping, and wherein at least one of the voxels of the plurality of voxels has a voxel shape that is different than a control voxel shape of the control voxel.

2. The modeling system of claim 1, wherein the plurality of control voxel surfaces are grouped into pairs of control voxel surfaces, and wherein the controller is configured to:
identify a control point on the unit cell structure;
provide a control voxel line between each pair of the pairs of control voxel surfaces that passes through the control point; and
identify a control point value for the control point on each control voxel line, wherein the mapping of the unit cell structure to the control voxel surfaces comprises a set of control point values.

3. The modeling system of claim 2, wherein the plurality of voxel surfaces grouped into pairs of voxel surfaces that correspond to the pairs of control voxel surfaces, and wherein the controller is configured to:
modify the unit cell structure to fit within each voxel by positioning the control point of the unit cell structure relative to the voxel surfaces according to the set of control point values of the mapping.

4. The modeling system of claim 3, wherein the controller is configured to:
provide a voxel line between each pair of the pairs of voxel surfaces corresponding to each control voxel line between each pair of the pairs of control voxel surfaces; and
position the control point within the voxel such that the voxel lines extend through the control point at a point proportional to the set of control point values.

5. The modeling system of claim 4, wherein the plurality of control voxel surfaces comprises six control voxel surfaces and is grouped into first, second, and third pairs of control voxel surfaces;
wherein first, second, and third control voxel lines between the first, second, and third pairs of control voxel surfaces, respectively, pass through the control point;
wherein first, second, and third control point values are provided for the first, second, and third control voxel lines, and wherein the set of control point values includes the first, second, and third control point values;
wherein the plurality of voxel surfaces comprises six voxel surfaces and is grouped into first, second, and third pairs of voxel surfaces corresponding to the first, second, and third pairs of control voxel surfaces, respectively;
wherein first, second, and third voxel lines between the first, second, and third pairs of voxel surfaces are provided; and
wherein the control point of the unit cell structure is positioned within the voxel such that the first, second, and third voxel lines pass through the control point according to the set of control point values defined relative to the control voxel surfaces.

6. The modeling system of claim 1, wherein the step of dividing a three-dimensional geometry into the plurality of voxels comprises the steps of:
generating a surface generally along an X, Y plane;
dividing the surface into a plurality of polygons by defining the plurality of polygons in part by a curve network of the three-dimensional geometry;
providing a plurality of surfaces along a Z-axis of the 3D geometry, each surface including the plurality of polygons; and
generating the plurality of voxels based on the plurality of surfaces, wherein each voxel is formed by a pair of adjacent polygons of adjacent surfaces, the voxel surfaces comprising the corresponding pair of adjacent polygons and areas spanning edges of the pair of adjacent polygons.

7. The modeling system of claim 6, wherein each polygon is a quadrangle.

8. The modeling system of claim 6, wherein at least one polygon in the plurality of polygons may be adjusted along the X, Y plane by a user.

9. The modeling system of claim 6, wherein at least one surface in the plurality of surfaces may be adjusted along the Z-axis by a user.

10. The modeling system of claim 6, wherein the plurality of control voxel surfaces are grouped into pairs of control voxel surfaces, and wherein the controller is configured to:
identify a control point on the unit cell structure;

provide a control voxel line between each pair of the pairs of control voxel surfaces that passes through the control point; and identify a control point value for the control point on each control voxel line, wherein the mapping of the unit cell structure to the control voxel surfaces comprises a set of control point values.

11. The modeling system of claim 10, wherein the plurality of voxel surfaces are grouped into pairs of voxel surfaces that correspond to the pairs of control voxel surfaces, and wherein the controller is configured to:

modify the unit cell structure to fit within each voxel by positioning the control point of the unit cell structure relative to the voxel surfaces according to the set of control point values of the mapping.

12. The modeling system of claim 11, wherein the controller is configured to:

provide a voxel line between each pair of the pairs of voxel surfaces corresponding to each control voxel line between each pair of the pairs of control voxel surfaces; and position the control point within the voxel such that the voxel lines extend through the control point at a point proportional to the set of control point values.

\* \* \* \* \*